UNITED STATES PATENT OFFICE 1,977,108

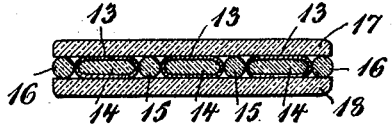
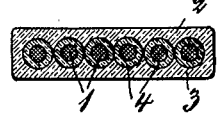
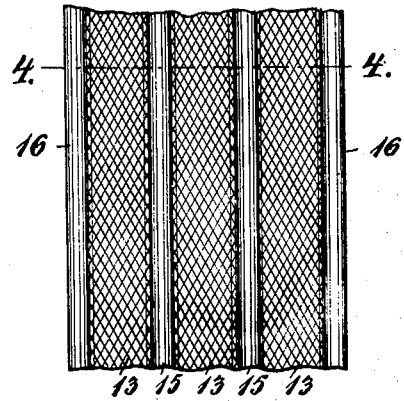
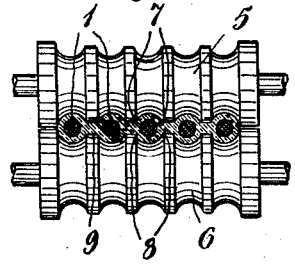
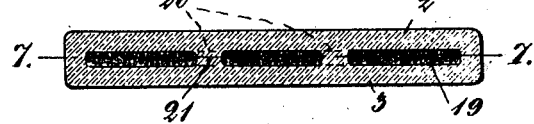
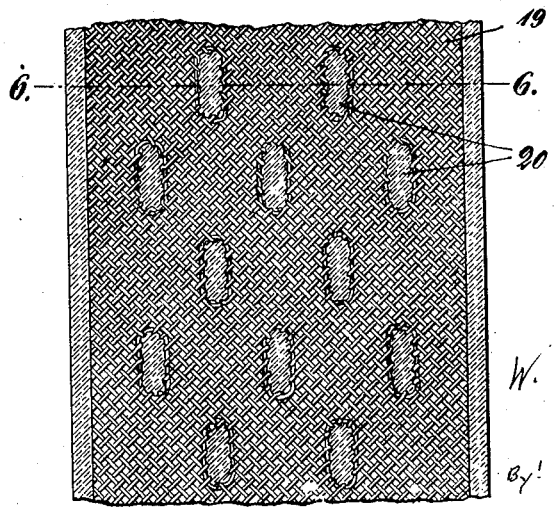

MANUFACTURE OF RUBBER BELTS

Wilhelm Theodor Arnberg, Kommunalhuset, Liljeholmen, Sweden

Application January 12, 1933, Serial No. 651,417
In Sweden January 28, 1929

4 Claims. (Cl. 154—4)

The present invention relates to a method of manufacturing rubber belts provided with reinforcing insertions in the form of threads, strings or ropes or a band or bands extending in the longitudinal direction of the belt. Hitherto belts of this kind have been manufactured in such a manner, that a layer of rubber has been applied at opposite sides of a plurality of threads stretched in a common plane whereupon the whole has been compressed and vulcanized. It has been found, however, that upon compression in the vulcanizing apparatus the reinforcing threads, which for the purpose of attaining a great tensile strength of the belt must be disposed rather closely together, are flattened out and brought in close contact with one another so that the rubber cannot penetrate between the threads and unite the two enclosing layers of rubber in the manner required. Said condition is illustrated in Figure 1 of the accompanying drawing, in which 1 denotes the different threads, and 2 and 3 the two layers of rubber. For this reason belts manufactured in the manner described are not very durable, the layer of threads breaking loose from the enveloping rubber after the belt has been used for some time, so that in some cases the belt will split in two halves along the reinforcing insertions.

The object of the present invention is to provide an improved method of manufacturing rubber belts of the kind in question whereby said inconveniences may be entirely avoided. The invention consists substantially therein that the spaces between the threads or the like, or openings provided in the band or bands respectively, are filled out with rubber which through pressure is united with the layers of rubber applied at opposite sides of the layer of threads or other reinforcing insertion to form a coherent mass of rubber enveloping the threads or the like, which mass of rubber is then vulcanized.

The invention is illustrated in Figure 2 of the accompanying drawing which shows a cross section of a belt manufactured according to the invention. The threads 1, which are individually covered with a layer 4 of rubber, are placed side by side so as to form a band-shaped core. Said core is preferably provided with a common covering of rubber which may be produced in known manner by applying two layers 2, 3 of rubber at opposite sides of said core. The whole is then compressed in a vulcanizing mould and vulcanized. This method of production insures that the two outer layers 2, 3 will always be united in the requisite manner by means of rubber portions extending between the threads. In regard to other details of the manufacturing process, methods known in and per se may be used. The core of the belt may thus be manufactured from a single thread wound about two drums so as to form an endless band with the threads lying close together. The core may also be made in such a manner that a plurality of separate threads each provided with an individual covering of rubber are stretched side by side in the same plane and compressed. When manufacturing the core the covering of rubber on the threads is preferably in an unvulcanized condition. During the following compression and vulcanizing process the coverings 4 of rubber on adjacent threads will be firmly secured together and to the outer rubber layers 2, 3. In certain cases it may not be necessary to apply special layers 2, 3 of rubber at both sides of the threads as the rubber coverings 4 on the threads may be sufficient to constitute upon compression the required rubber material in the belt. The rubber covering on the threads may, if desired, be vulcanized in advance and thereafter provided with a common outer wrapping or envelope of rubber which is finally vulcanized while compressing the same about the core.

Figure 3 shows a modification of the method described above according to which all the threads included in the belt may be simultaneously provided with a rubber covering. For this purpose grooved pressing members preferably in the form of rollers 5, 6 are used, between which two band-shaped layers of rubber are compressed with the threads 1 extending between them in such a manner that each thread will be situated in a corresponding groove. The ridges 7, 8 between the grooves are then preferably so low that after compression the layers of rubber will form a coherent grooved rubber band 9 in which the rubber portions surrounding the individual threads are united by means of rubber portions of a smaller thickness. The vulcanizing can take place either simultaneously with the shaping of this rubber band or afterwards. The grooved rubber band manufactured in this manner may either be used in this form as a belt or, if desired, it may be provided with a covering of rubber, either on both sides or on one side only, for the purpose of obtaining even belt surfaces. Such a covering may by way of example be produced in a manner known per se by applying two layers of rubber at opposite sides of the grooved core and compressing and vulcanizing in usual manner.

In place of single threads, ropes consisting of threads that have been twisted or braided together may also be used. The term ropes is then intended to cover every such product of the rope maker's art which consists of parts twisted or braided together, each of such parts in turn consisting either of single threads or of threads or parts twisted together. In such products are thus included the products which in the rope making industry are termed strands, cords, ropes or the like. The threads and ropes respectively preferably consist of a textile material, such as jute, hemp, flax, cotton etcetera but may also consist of metal wire.

The reinforcing insertion may not necessarily be in the shape of a band but may in, for example, ropeshaped rubber belts have an arbitrary form determined in accordance with the cross sectional shape of the belt.

Figures 4 and 5 illustrate another method of producing rubber belts with reinforcing insertions. In the shown example the reinforcing insertion consists of a plurality of braided sleeves or tubes 13 of textile material extending in the longitudinal direction of the belt and filled with rubber 14 which in unvulcanized condition is pressed into the sleeve. In the manufacturing of such a belt said sleeves are extended parallel with each other and slightly spaced, the spaces being if desired filled out with strings 15 of unvulcanized rubber. Along the outer edge of the two outer sleeves similar rubber strings 16 are applied, whereupon layers 17, 18 of unvulcanized rubber are applied on both sides of the core thus formed, said core having in unvulcanized condition the sectional shape shown diagrammatically in Figure 4. The belt is then compressed in usual manner in a vulcanizing apparatus and vulcanized, the strings 15 and 16 being then united with the layers 17 and 18 to a homogeneous mass. Under the action of the pressure part of the rubber 14 enclosed in the sleeves is also pressed through the perforations or meshes in the sleeves so that they are united with the outer layers 17, 18 of rubber by means of strings of rubber extending in a transverse direction through the sleeves. The two outer layers 17, 18 are thus combined with each other in the requisite manner by means of coherent sections of rubber.

The introduction of the rubber in the sleeves is preferably effected by pressing the rubber into the sleeves in an unvulcanized condition, the sleeves then assuming a round cross-sectional shape. The cylindrical form having a greater volume than the flat form it follows that upon compression in the vulcanizing mould the entrapped rubber mass will be driven out through the perforations in the sleeves. In some cases the sleeves may be produced directly on cylindrical strings of unvulcanized rubber by braiding the sleeves about the strings in a continuous working operation.

The sleeves may, of course, instead be woven and provided with perforations in a suitable manner.

The braided or woven insertions must not necessarily be tubular but may also consist of thin bands provided with throughgoing holes. A belt built up in this manner is shown in Figures 6 and 7. In these figures 2 and 3 denote the outer layers of rubber, whereas 19 is the reinforcing insertion in the form of a woven band. In order to obtain a maximum tensile strength the warp threads of the fabric extend longitudinally of the belt. At suitable points the band 19 is provided with openings 20, which upon compression of the outer layers of rubber 2 and 3 with the intervening reinforcing band are filled out with rubber forming ties or ligaments 20 firmly uniting said layers.

The insertions may of course, also be arranged in several layers with intervening layers of rubber, the number of sleeves or bands arranged side by side being determined in accordance with the desired properties of the belt.

I claim:

1. A method of making belting which consists in conducting a number of longitudinal reinforcing members parallelly in a plane, conducting a longitudinal layer of rubber material on each side of said plane, compressing said layers in a grooved pressing device in such a manner that each groove engages one of said members, part of the rubber material being then, by means of the ridges between the grooves, pressed into the spaces between the members so as to fill out said spaces and uniting the two layers.

2. A method of producing rubber belts according to claim 1, which consists in covering the grooved core with rubber on one or on both sides, and vulcanizing the whole.

3. A method of making belting, which consists in pouring unvulcanized rubber into tubular or sleeve-shaped reinforcing members of textile material, placing said reinforcing members side by side, compressing said reinforcing members between two layers of unvulcanized rubber, and vulcanizing the whole.

4. A method of making belting, which consists in pouring unvulcanized rubber into tubular or sleeve-shaped reinforcing members of textile material, disposing said tubes or sleeves suitably spaced side by side, inserting longitudinally extending rubber strings between the different tubes or sleeves, compressing said reinforcing members with intermediate strings of rubber between two layers of unvulcanized rubber, and vulcanizing the whole.

WILHELM THEODOR ARNBERG.